US012590670B2

(12) United States Patent　(10) Patent No.:　US 12,590,670 B2
Cheng et al.　(45) Date of Patent:　Mar. 31, 2026

(54) ELECTRONIC DEVICE AND PHOTOGRAPHIC APPARATUS THEREOF

(71) Applicant: VIVO MOBILE COMMUNICATION CO., LTD., Dongguan (CN)

(72) Inventors: Hongchao Cheng, Dongguan (CN); Liyi Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 135 days.

(21) Appl. No.: 18/210,056

(22) Filed: Jun. 14, 2023

(65) Prior Publication Data

US 2023/0323998 A1　　Oct. 12, 2023

Related U.S. Application Data

(63) Continuation of application No. PCT/CN2021/136969, filed on Dec. 10, 2021.

(30) Foreign Application Priority Data

Dec. 15, 2020　(CN) .......................... 202011476583.7

(51) Int. Cl.
*F16M 11/18*　　(2006.01)
*F16M 11/04*　　(2006.01)
(Continued)

(52) U.S. Cl.
CPC .............. *F16M 11/18* (2013.01); *F16M 11/04* (2013.01); *F16M 11/08* (2013.01); *G03B 17/561* (2013.01)

(58) Field of Classification Search
CPC ........ F16M 11/18; F16M 11/04; F16M 11/08; G03B 17/56
(Continued)

(56) References Cited

U.S. PATENT DOCUMENTS 3,352,521 A * 11/1967 Tyler .................. F16M 11/2035
359/557
5,619,735 A * 4/1997 Kai ...................... H04N 23/687
348/E5.046
(Continued)

FOREIGN PATENT DOCUMENTS

CN　　102400614 A　*　4/2012
CN　　102445379 A　*　5/2012
(Continued)

OTHER PUBLICATIONS

International Search Report issued in corresponding International Application No. PCT/CN2021/136969, mailed Feb. 28, 2022, 4 pages.
(Continued)

*Primary Examiner* — Stephanie E Bloss
*Assistant Examiner* — Kevin C Butler
(74) *Attorney, Agent, or Firm* — IPX PLLC

(57)　　ABSTRACT

An electronic device and a photographic apparatus thereof are provided. The photographic apparatus includes a camera, a camera holder, and an anti-shake mechanism. The camera is supported on the camera holder through the anti-shake mechanism, and is provided with a first connecting hole and a second connecting hole arranged at intervals. The anti-shake mechanism includes a first anti-shake connecting portion, a second anti-shake connecting portion, a swing rod, and a driving portion. The driving portion and the first anti-shake connecting portion are arranged on the camera holder. The swing rod is rotatably connected to the camera holder. The driving portion is connected to the swing rod and drives the swing rod to rotate. The second anti-shake connecting portion is arranged on the swing rod and can swing with the swing rod.

18 Claims, 5 Drawing Sheets

(51) Int. Cl.
    *F16M 11/08*     (2006.01)
    *G03B 17/56*     (2021.01)

(58) Field of Classification Search
    USPC ........................................................ 396/428
    See application file for complete search history.

(56)         References Cited

U.S. PATENT DOCUMENTS

| | | | | |
|---|---|---|---|---|
| 7,936,984 B2 * | 5/2011 | Greb | ...................... | F16M 13/00 |
| | | | | 396/421 |
| 2009/0101773 A1 * | 4/2009 | Yang | .................... | G03B 17/566 |
| | | | | 248/181.1 |
| 2009/0257741 A1 * | 10/2009 | Greb | ...................... | F16M 13/00 |
| | | | | 348/208.7 |
| 2023/0323998 A1 * | 10/2023 | Cheng | .................... | F16M 11/04 |
| | | | | 396/428 |

FOREIGN PATENT DOCUMENTS

| | | | | | |
|---|---|---|---|---|---|
| CN | 203622047 | U | * | 6/2014 | |
| CN | 205144467 | U | * | 4/2016 | |
| CN | 205118613 | A | | 6/2016 | |
| CN | 106122704 | B | * | 12/2017 | |
| CN | 108266615 | A | | 7/2018 | |
| CN | 208084351 | U | | 11/2018 | |
| CN | 208331699 | U | * | 1/2019 | |
| CN | 110047333 | A | | 7/2019 | |
| CN | 209402560 | U | * | 9/2019 | |
| CN | 210431574 | U | | 4/2020 | |
| CN | 210781015 | U | | 6/2020 | |
| CN | 211509161 | U | * | 9/2020 | |
| CN | 112503341 | A | | 3/2021 | |
| DE | 20200601749 | U1 | | 4/2007 | |
| DE | 202006017493 | U1 | * | 5/2007 | ............... A47C 7/70 |
| GB | 1137322 | A | | 12/1968 | |
| GB | 0413957 | | | 7/2004 | |
| JP | 2011209643 | A | * | 10/2011 | |

OTHER PUBLICATIONS

Ping Huang, "Atlas of common mechanical parts and mechanisms", Sep. 30, 1999, p. 16-17.
First Office Action issued in related Chinese Application No. 202011476583.7, mailed Jan. 28, 2022, 9 pages.

* cited by examiner

ELECTRONIC DEVICE AND PHOTOGRAPHIC APPARATUS THEREOF

CROSS-REFERENCE

The present application is a continuation of International Application No. PCT/CN2021/136969, filed on Dec. 10, 2021, which claims priority to Chinese Patent Application No. 202011476583.7, filed on Dec. 15, 2020. The entire contents of each of the above-referenced applications are expressly incorporated herein by reference.

TECHNICAL FIELD

This application relates to the technical field of communication devices, and in particular, to an electronic device and a photographic apparatus thereof.

BACKGROUND

With the increase of user demand and the development of technology, performance of electronic devices is continuously optimized. An outstanding phenomenon is that the shooting performance of current electronic devices is getting better and better. As we all know, the handheld electronic device of the user may shake during the shooting process, which may further affect the final shooting quality.

Based on this, in the related art, the camera of the electronic device is installed on a micro pan/tilt, and the micro pan/tilt is provided with an electromagnetic driving mechanism, which can drive the camera to rotate relative to the micro pan/tilt, so as to realize motion compensation and achieve the purpose of anti-shake.

However, the electromagnetic driving mechanism drives the camera to move through electromagnetic force, which leads to no magnetic component around the micro pan/tilt, otherwise the electromagnetic driving mechanism is easier to be interfered with, which may eventually affect the anti-shake effect.

SUMMARY

This application discloses an electronic device and a photographic apparatus thereof.

The following technical solutions are used in this application.

According to a first aspect, this application discloses a photographic apparatus, including a camera, a camera holder, and an anti-shake mechanism, where the camera is supported on the camera holder through the anti-shake mechanism, and the camera is provided with a first connecting hole and a second connecting hole arranged at intervals; the anti-shake mechanism includes a first anti-shake connecting portion, a second anti-shake connecting portion, a swing rod, and a driving portion, and the driving portion and the first anti-shake connecting portion are arranged on the camera holder; the swing rod is rotatably connected to the camera holder, the driving portion is connected to the swing rod and drives the swing rod to rotate, and the second anti-shake connecting portion is arranged on the swing rod and can swing with the swing rod; and in a case that the first anti-shake connecting portion is connected to the first connecting hole, and the second anti-shake connecting portion is connected to the second connecting hole, the camera can rotate around the first anti-shake connecting portion with the swing of the swing rod.

According to a second aspect, this application discloses an electronic device, including the photographic apparatus described above.

According to the electronic device and the photographic apparatus thereof disclosed in this application, the anti-shake mechanism is arranged on the photographic apparatus, and the anti-shake mechanism includes the first anti-shake connecting portion, the second anti-shake connecting portion, the swing rod, and the driving portion, and the first anti-shake connecting portion is connected to the first connecting hole of the camera, and the second anti-shake connecting portion is connected to the second connecting hole of the camera, so that the camera can finally rotate around the first anti-shake connecting portion with the swing of the swing rod, thereby achieving anti-shake effect of the camera, and further realizing anti-shake of the photographic apparatus and the electronic device.

DETAILED DESCRIPTION

To make the objectives, technical solutions, and advantages of this application clearer, the following clearly describes the technical solutions of this application with reference to the embodiments of this application and the corresponding accompanying drawings. Apparently, the described embodiments are merely some rather than all of the embodiments of this application. All other embodiments obtained by a person of ordinary skill in the art based on embodiments of this application without creative efforts shall fall within the protection scope of this application.

The technical solutions disclosed in embodiments of this application are described in detail below with reference to the accompanying drawings.

Figure 1:
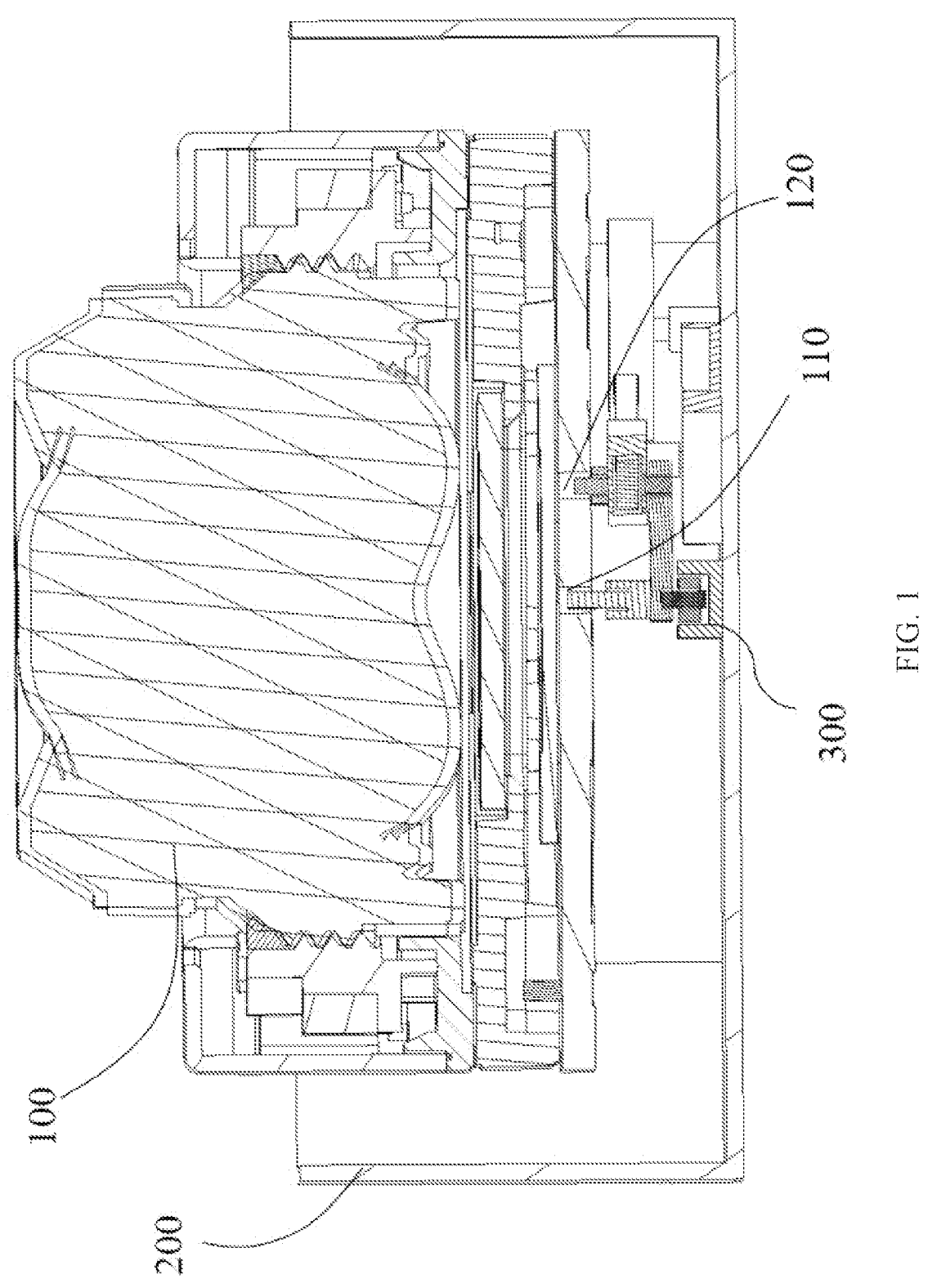
FIG. 1 is a diagram of an overall structure of a photographic apparatus according to an embodiment of this application.

In some embodiments, a photographic apparatus as shown in FIG. 1 includes a camera 100, a camera holder 200, and an anti-shake mechanism 300. The camera 100 is supported on the camera holder 200 through the anti-shake mechanism 300. The camera 100 is provided with a first connecting hole 110 and a second connecting hole 120, and the first connecting hole 110 and the second connecting hole 120 are arranged at intervals, that is, there is a distance between the first connecting hole 110 and the second connecting hole 120.

Figure 2:
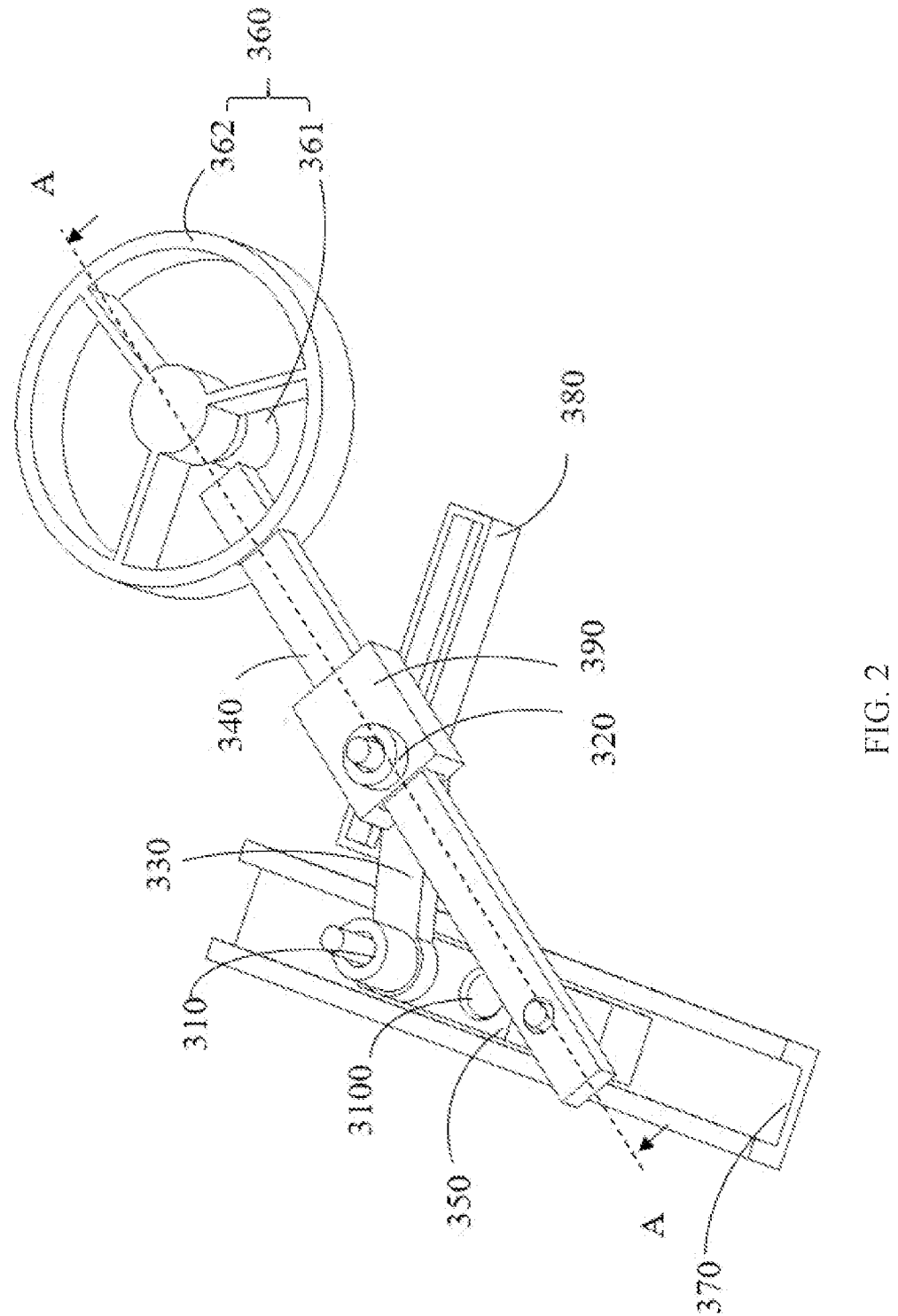
FIG. 2 is a diagram of an overall structure of an anti-shake mechanism according to an embodiment of this application.

As shown in FIG. 1 and FIG. 2, the anti-shake mechanism includes a first anti-shake connecting portion 310, a second anti-shake connecting portion 320, a swing rod 340, and a driving portion 360. The driving portion 360 and the first anti-shake connecting portion 310 are arranged on the camera holder 200.

The swing rod 340 is rotatably connected to the camera holder 200, and the driving portion 360 is connected to the swing rod 340 and can drive the swing rod 340 to rotate. The second anti-shake connecting portion 320 is arranged on the swing rod 340 and can swing with the swing rod 340.

Figure 3:
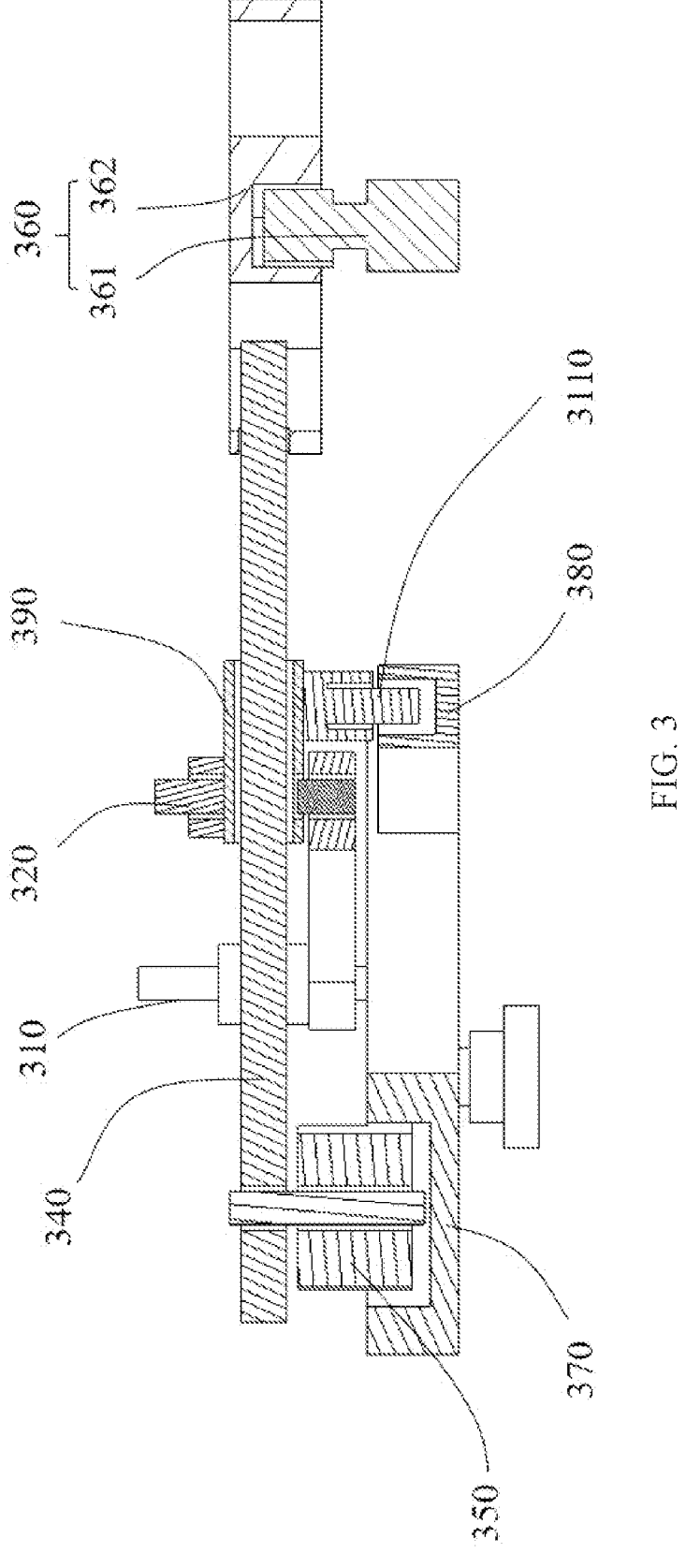
FIG. 3 is a sectioned diagram of FIG. 2 in A-A direction according to an embodiment of this application.
Figure 4:
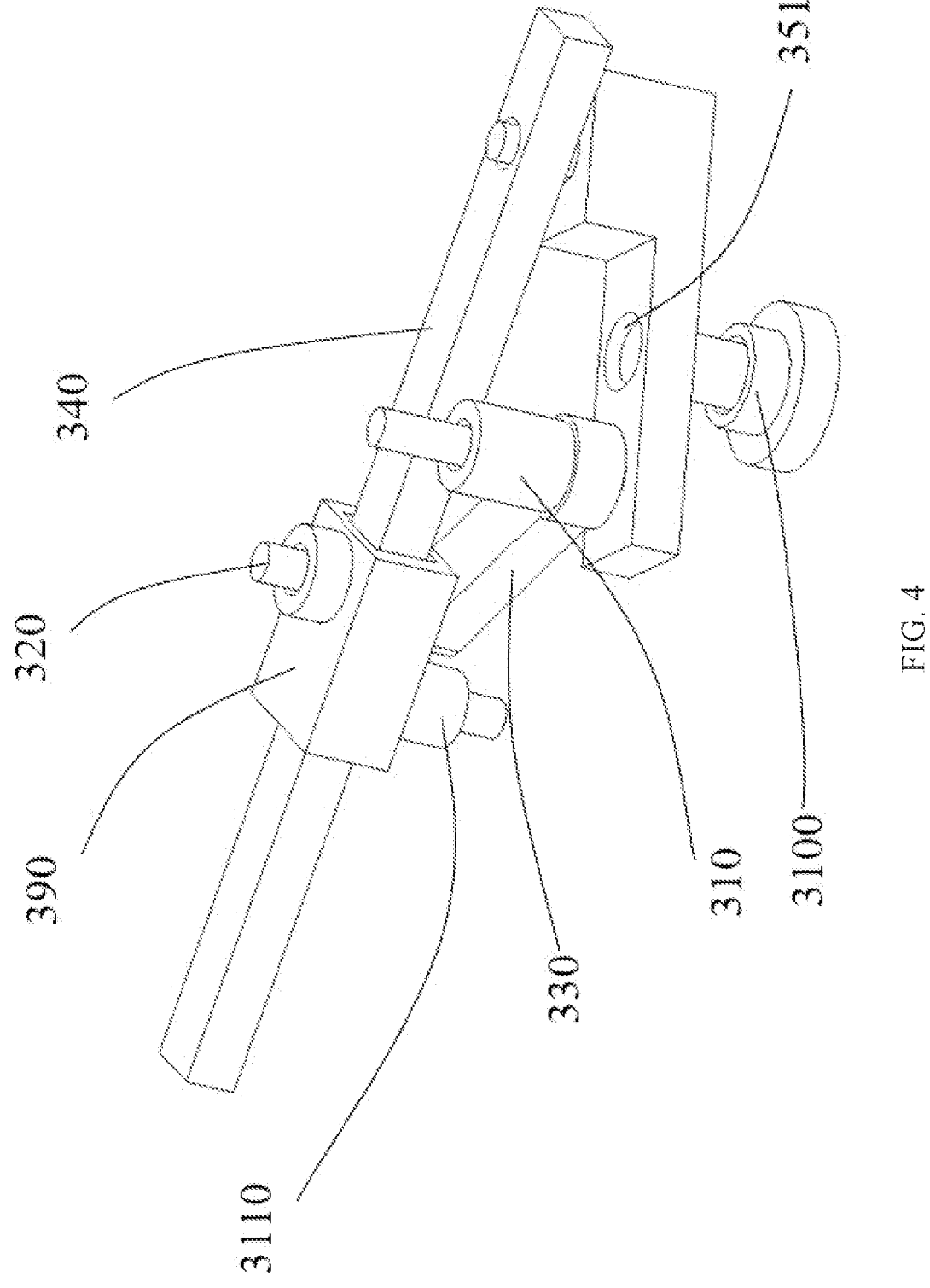
FIG. 4 is a structural diagram of an anti-shake mechanism removing a driving portion, a first guide rail, and a second guide rail according to an embodiment of this application.
Figure 5:
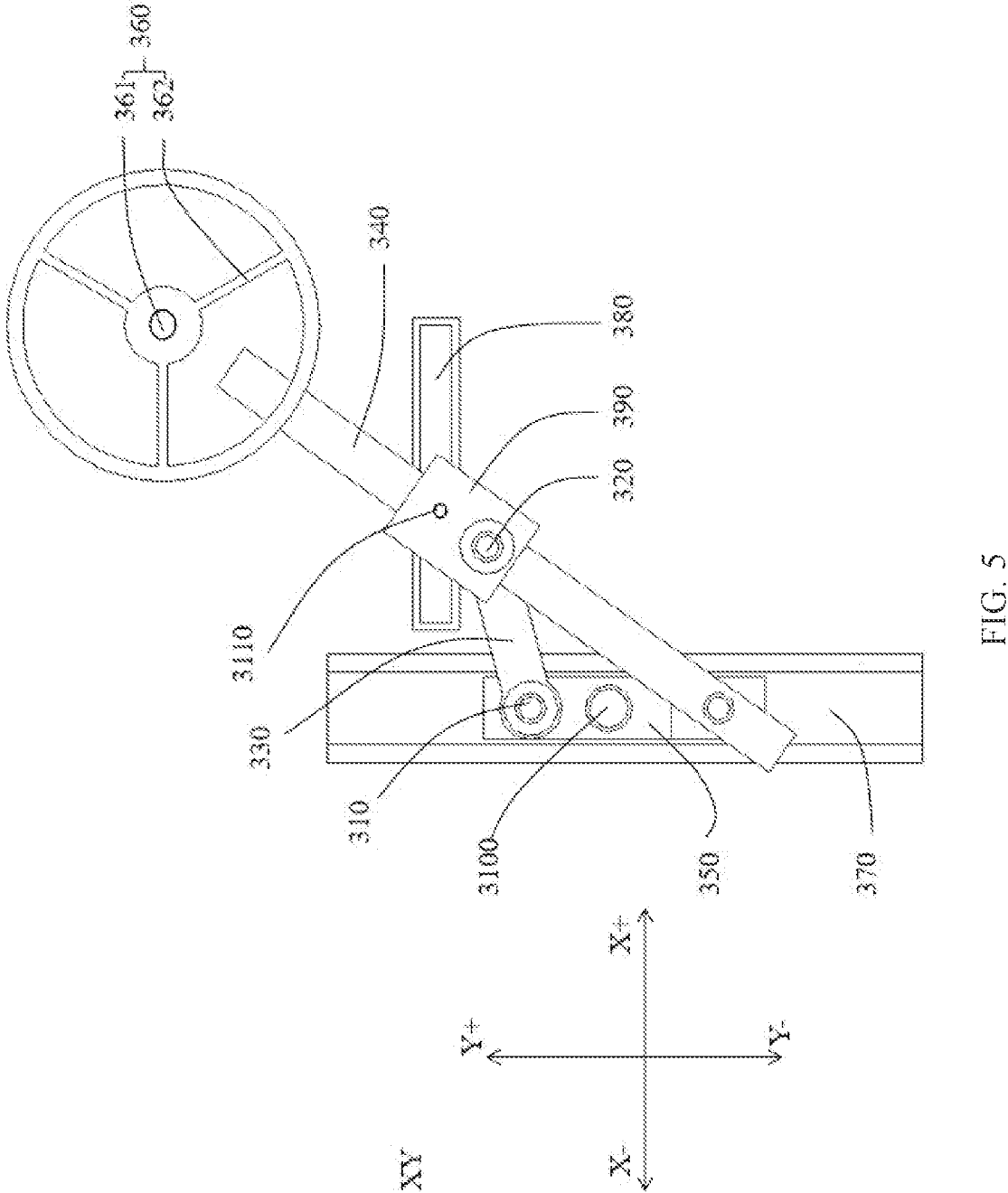
FIG. 5 is a main view of an anti-shake mechanism according to an embodiment of this application.

As shown in FIG. 5, an X axis and a Y axis perpendicular to each other are set in space, and the X axis and the Y axis are located in an XY plane. The swing rod 340 rotates in the XY plane, and both a rotation axis of the swing rod 340 and a swing axis around which the second anti-shake connecting portion 320 rotates are perpendicular to the XY plane. As shown in FIG. 1, FIG. 3, and FIG. 5, in a case that the first anti-shake connecting portion 310 is connected to the first connecting hole 110, and the second anti-shake connecting portion 320 is connected to the second connecting hole 120, the driving portion 360 drives the swing rod 340 to rotate, which will drive the second anti-shake connecting portion 320 to follow the swing rod 340 to move, so that the second anti-shake connecting portion 320 rotates around the first anti-shake connecting portion 310 and drives the camera 100 to follow the second anti-shake connecting portion 320 to rotate around the first anti-shake connecting portion 310. Finally, the camera 100 can achieve the anti-shake effect through rotation adjustment.

It should be noted herein that connection manners between the first anti-shake connecting portion 310 and the first connecting hole 110, and between the second anti-shake connecting portion 320 and the second connecting hole 120 can be realized by inserting and fixing, screw connection, magnetic attraction fixing, or the like, and other fixed or detachable connection manners can also be adopted. The manner in which the driving portion 360 drives the swing rod 340 to rotate is not limited. The driving portion 360 may be arranged at a rotating connection end of the camera holder 200 of the swing rod 340 and coaxial with the rotation axis of the swing rod 340. For example, the driving portion 360 is set as a motor and is connected to the rotation axis of the swing rod 340 by a hub, or the driving portion 360 is a combination of a motor, a chain transmission mechanism, and a belt transmission mechanism to drive the swing rod 340 to rotate.

For example, as shown in FIG. 2 and FIG. 5, the anti-shake mechanism further includes a connecting rod 330. A first end of the connecting rod 330 is rotatably connected to the first anti-shake connecting portion 310, and a second end of the connecting rod 330 is rotatably connected to the second anti-shake connecting portion 320. In this way, the second anti-shake connecting portion 320 will swing around the first anti-shake connecting portion 310 with the connecting rod 330 as the radius, which can enhance the structure stability of the anti-shake mechanism and better control the camera 100 to rotate.

Further, the anti-shake mechanism further includes a first base 350. The first base 350 is arranged on the camera holder 200, the first anti-shake connecting portion 310 is arranged on the first base 350, and the swing rod 340 is rotatably connected to the first base 350. In this way, the first base 350 may be used as an intermediate carrier to realize disassembly and assembly of the entire anti-shake mechanism for the camera holder 200, thus increasing the convenience degree of the apparatus of this application. As for the connection manner, the first base 350 and the camera holder 200 can be fixed by screw connecting, welding, bonding, or the like, or can also be integrated.

In a further embodiment, in order to prevent the position of the optical axis from shifting when rotation adjustment is performed on the camera 100 by using the anti-shake mechanism, the axis along which the camera 100 rotates around the first anti-shake connecting portion 310 is set to be coaxial with the optical axis of the camera 100, that is, the camera 100 always rotates around its own optical axis during the rotation adjustment.

In some embodiments, as shown in FIG. 2 to FIG. 5, the anti-shake mechanism 300 may further include a first guide rail 370, a second guide rail 380, a second base 390, a third anti-shake connecting portion 3100, and a fourth anti-shake connecting portion 3110. For example, both the first guide rail 370 and the second guide rail 380 are fixed on the camera holder 200, for example, by welding, bonding, bolt connection, integrated arrangement, and other fixed manners. The first guide rail 370 and the second guide rail 380 are perpendicular to each other.

Both the third anti-shake connecting portion 3100 and the first base 350 are arranged on the first guide rail 370. Both the second anti-shake connecting portion 320 and the fourth anti-shake connecting portion 3110 are arranged on the second base 390, and the second base 390 is slidably arranged on the swing rod 340. For example, the second base 390 has a sliding sleeve structure and is movably sleeved on the swing rod 340, so that the second base 390 can slide relative to the swing rod 340, while the fourth anti-shake connecting portion 3110 and the second anti-shake connecting portion 320 are arranged opposite to each other and respectively located on two opposite end surfaces of the second base 390. For another example, the fourth anti-shake connecting portion 3110, the second base 390, and the second anti-shake connecting portion 320 are connected in sequence to form a sliding axle, a guide hole is arranged in the swing rod 340, and the second base 390 of the sliding axle is slidably arranged in the guide hole to realize sliding relative to the swing rod 340. Both the fourth anti-shake connecting portion 3110 and the second anti-shake connecting portion 320 extend out of the swing rod 340 and respectively form end heads located at two opposite ends of the sliding axle.

In this way, a manner in which the camera 100 achieves anti-shake through rotation adjustment is: in a case that the first anti-shake connecting portion 310 is connected to the first connecting hole 110, and the second anti-shake connecting portion 320 is connected to the second connecting hole 120, the fourth anti-shake connecting portion 3110 is separated from the second guide rail 380, the third anti-shake connecting portion 3100 is connected to the first guide rail 370 and the first base 350, the first base 350 is positioned by the third anti-shake connecting portion 3100 in a guiding direction of the first guide rail 370, and the camera 100 can rotate around the first anti-shake connecting portion 310 with the swing of the swing rod 340.

It should be noted herein that the third anti-shake connecting portion 3100 may be an ejectable limiting stopper arranged on the first guide rail 370, which stops the first base 350 in the guiding direction of the first guide rail 370 by ejecting out of the first guide rail 370, and is separated from the first base 350 by returning to the first guide rail 370. The third anti-shake connecting portion 3100 may also be an electromagnetic mechanism, and the first base 350 is attracted to the first guide rail 370 by power-on magnetic adsorption, so that the first base 350 can be positioned, and separation from the first base 350 is achieved by power-off degaussing.

In addition, on this basis, the camera 100 can further achieve anti-shake by moving along the Y-axis direction, and a manner is as follows: in a case that the first anti-shake connecting portion 310 is connected to the first connecting hole 110, and the second anti-shake connecting portion 320 is connected to the second connecting hole 120, the fourth anti-shake connecting portion 3110 is slidably fitted to the second guide rail 380, the third anti-shake connecting portion 3100 is separated from the first base 350, the first base 350 can slide along the first guide rail 370, and the camera 100 can move along the first guide rail 370 with the first base 350 through the first anti-shake connecting portion 310.

Further, the camera 100 can further achieve anti-shake by moving along the X-axis direction, and a manner is as follows: in a case that the first anti-shake connecting portion 310 is separated from the first connecting hole 110, and the second anti-shake connecting portion 320 is connected to the second connecting hole 120, the fourth anti-shake connecting portion 3110 is slidably fitted to the second guide rail 380, the third anti-shake connecting portion 3100 is separated from the first base 350, the first base 350 can slide along the first guide rail 370, and the camera 100 can move along the second guide rail 380 with the fourth anti-shake connecting portion 3110 through the second anti-shake connecting portion 320. In this way, the camera 100 can realize anti-shake by movement adjustment in two linear directions and rotation adjustment in one rotation axis direction, and the anti-shake effect is further optimized by a comprehensive adjustment manner of two moving degrees of freedom plus one rotating degree of freedom.

In addition, it should be noted that both the first anti-shake connecting portion 310 and the first connecting hole 110, and the second anti-shake connecting portion 320 and the second connecting hole 120 need to be connected or separated according to the actual anti-shake requirements, which can be realized by magnetic attraction herein. For example, a magnet is embedded in the first connecting hole 110 and the second connecting hole 120, while the first anti-shake connecting portion 310 and the second anti-shake connecting portion 320 form an electromagnetic mechanism, and the first anti-shake connecting portion 310 and the second anti-shake connecting portion 320 can be connected or disconnected by power-on or power-off of the electromagnetic mechanism. As for the sliding fit between the fourth anti-shake connecting portion 3110 and the second guide rail 380, and between the first base 350 and the first guide rail 370, the second guide rail 380 and the first guide rail 370 may be convex bars protruding from the camera holder 200, and both the fourth anti-shake connecting portion 3110 and the first base 350 have grooves matching the convex bars, and the sliding fit is realized by inserting the convex bars into the grooves.

In some embodiments, the first anti-shake connecting portion 310 in this application is a first telescopic structural member. The first telescopic structural member has a first extended state and a first contracted state, in the first extended state, the first anti-shake connecting portion 310 extends into the first connecting hole 110 to be connected to the first connecting hole 110, and in the first contracted state, the first anti-shake connecting portion 310 retracts to be separated from the first connecting hole 110.

For example, the second anti-shake connecting portion 320 is a second telescopic structural member. The second telescopic structural member has a second extended state and a second contracted state, in the second extended state, the second anti-shake connecting portion 320 extends into the second connecting hole 120 to be connected to the second connecting hole 120, and in the second contracted state, the second anti-shake connecting portion 320 retracts to be separated from the second connecting hole 120.

In this way, the first anti-shake connecting portion 310 and the first connecting hole 110, and the second anti-shake connecting portion 320 and the second connecting hole 120 are connected or separated by the telescopic manner of the telescopic member, which is easier to control the anti-shake manner of the camera 100 in this application. In addition, it should be noted that the telescopic member can also be installed in the first connecting hole 110 and the second connecting hole 120, the first anti-shake connecting portion 310 and the second anti-shake connecting portion 320 are provided with matching jacks, and connection and separation between the first anti-shake connecting portion 310 and the second anti-shake connecting portion 320 can also be realized through expansion and contraction of the telescopic member.

Further, the third anti-shake connecting portion 3100 is a third telescopic structural member, and the third telescopic structural member has a third extended state and a third contracted state. The third telescopic structural member is arranged on the first guide rail 370, the first base 350 is provided with a positioning hole 351, in the third extended state, the third telescopic structural member extends into the positioning hole 351, and the first base 350 is positioned in the guiding direction of the first guide rail 370, in the third contracted state, the third telescopic structural member retracts and is separated from the positioning hole 351, and the first base 350 can move along the first guide rail 370. In this way, the positioning and non-positioning for the first base 350 is realized through the expansion and contraction of the third anti-shake connecting portion 3100, which is more convenient for the control of the anti-shake mechanism and the selection of the anti-shake manner.

In addition, it should be noted that the third telescopic structural member can also be arranged on the first base 350, and the positioning hole 351 is arranged on the first guide rail 370, so that the positioning and non-positioning for the first base 350 can also be realized, and details are not described herein.

For example, the first guide rail 370 is a first groove body, and the first base 350 is arranged in the first groove body. The second guide rail 380 is a second groove body, and the fourth anti-shake connecting portion 3110 is partially located in the second groove body and is slidably fitted to the second groove body.

In this way, with the sliding of the first base 350 in the first groove body and the sliding of the fourth anti-shake connecting portion 3110 in the second groove body, the camera 100 may perform anti-shake adjustment by moving along the Y-axis direction in a case that the first anti-shake connecting portion 310 is connected to the first connecting hole 110, and the second anti-shake connecting portion 320 is separated from the second connecting hole 120, or in a case that the first anti-shake connecting portion 310 is separated from the first connecting hole 110, and the second anti-shake connecting portion 320 is connected to the second connecting hole 120, the camera 100 selects to perform anti-shake adjustment by moving along the Y-axis direction. As a result, it is more convenient for the camera 100 to perform movement adjustment in two linear direction degrees of freedom.

In addition, it should be noted that both the first guide rail 370 and the second guide rail 380 may be convex bars arranged in pairs and protruding on the camera holder 200, so that a first groove body and a second groove body are formed between the two convex bars; the first guide rail 370 and the second guide rail 380 may also be bosses arranged on the camera holder 200, and the first groove body and the second groove body are arranged in the bosses; and in some alternative embodiments, the camera holder 200 may be directly provided with a first groove body and a second groove body that are recessed.

In a further implementation solution, the fourth anti-shake connecting portion 3110 is a fourth telescopic structural member, and the fourth telescopic structural member has a fourth extended state and a fourth contracted state, in the fourth extended state, the fourth telescopic structural member extends into the second groove body and is slidably fitted to the second groove body, and in the fourth contracted state, the fourth telescopic structural member retracts to be located outside the second groove body. The connection or separation between the fourth anti-shake connecting portion 3110 and the second guide rail 380 is realized in a telescopic manner, which enables the apparatus in this application to be easier to control.

In some embodiments, as shown in FIG. 2 and FIG. 5, the driving portion 360 includes a driving motor 361 and a rotating wheel 362. A first end of the swing rod 340 is rotatably connected to the first base 350, a second end of the swing rod 340 is movably connected to the rotating wheel 362, and the driving motor 361 is connected to the rotating wheel 362. In this way, the driving motor 361 drives the rotating wheel 362 to rotate, so that the rotating wheel 362 can drive the swing rod 340 to swing, and the driving portion 360, the swing rod 340, and other parts can be arranged on a same thickness of the photographic apparatus, for example, arranged in the same XY plane to reduce the overall thickness.

It should be noted herein that in the manner that the rotating wheel 362 is movably connected to the swing rod 340, the rotating wheel 362 may be provided with a waist-shaped hole in a circumferential direction, the second end of the swing rod 340 is inserted into the waist-shaped hole, and can be fitted in a clearance between the waist-shaped hole and the swing rod 340. An amount of clearance between the second end of the swing rod 340 and the waist-shaped hole is arranged in the circumferential direction of the rotating wheel 362, so that the rotating wheel 362 is driven to enable the swing rod 340 to rotate around the first end of the swing rod 340, and a margin from the amount of clearance can ensure that the rotating wheel 362 and the second end of the swing rod 340 will not be interfered and jammed. In some alternative embodiments, the rotating wheel 362 may be provided with a notch, the second end of the swing rod 340 is accommodated in the notch, and a width of the notch is greater than that of the second end of the swing rod 340, so that when the rotating wheel 362 rotates, the second end of the swing rod 340 is in the notch, leaving a space for relative movement with the rotating wheel 362, thus ensuring that the rotating wheel 362 can drive the swing rod 340 to rotate around the first end of the swing rod 340.

This application further proposes an electronic device, including the photographic apparatus described in the above embodiments of this application. The electronic device disclosed in the embodiments of this application may be a mobile phone, a tablet computer, an e-book reader, a wearable device (such as smart glasses, a smartwatch, or the like), a game machine, or the like. The electronic device may also be in other types, and the specific types of the electronic device are not limited in the embodiments of this application.

The foregoing embodiments of this application focus on describing differences between the embodiments, and different optimization features of the embodiments may be combined to form better embodiments provided that they are not contradictory. For brevity, details are not described herein again.

The embodiments described above are merely embodiments of this application, which are not intended to limit this application. Various changes and modifications may be made to this application by a person skilled in the art. Any modifications, equivalent substitutions, improvements, and the like made within the spirit and principle of this application should be included within the scope of the claims of this application.

The invention claimed is:

1. A photographic apparatus, comprising a camera; a camera holder; and an anti-shake mechanism, wherein:

the camera is supported on the camera holder through the anti-shake mechanism, and the camera is provided with a first connecting hole and a second connecting hole arranged at intervals;

the anti-shake mechanism comprises a first anti-shake connecting portion, a second anti-shake connecting portion, a swing rod, and a driving portion, and the driving portion and the first anti-shake connecting portion are arranged on the camera holder;

the swing rod is rotatably connected to the camera holder, the driving portion is connected to the swing rod and can drive the swing rod to rotate, and the second anti-shake connecting portion is arranged on the swing rod and can swing with the swing rod; and when the first anti-shake connecting portion is connected to the first connecting hole, and the second anti-shake connecting portion is connected to the second connecting hole, the camera can rotate around a rotation axis of the first anti-shake connecting portion with the swing of the swing rod, wherein the optical axis of the camera is coaxial with the rotation axis of the first anti-shake connecting portion.

2. The photographic apparatus according to claim 1, wherein the anti-shake mechanism further comprises a connecting rod, wherein a first end of the connecting rod is rotatably connected to the first anti-shake connecting portion, and a second end of the connecting rod is rotatably connected to the second anti-shake connecting portion.

3. The photographic apparatus according to claim 2, wherein the anti-shake mechanism further comprises a first base, wherein:

the first base is arranged on the camera holder, the first anti-shake connecting portion is arranged on the first base, and the swing rod is rotatably connected to the first base.

4. The photographic apparatus according to claim 3, wherein the anti-shake mechanism further comprises a first guide rail, a second guide rail, a second base, a third anti-shake connecting portion, and a fourth anti-shake connecting portion, wherein:

both the first guide rail and the second guide rail are fixed on the camera holder, and the first guide rail and the second guide rail are perpendicular to each other;

both the third anti-shake connecting portion and the first base are arranged on the first guide rail;

both the second anti-shake connecting portion and the fourth anti-shake connecting portion are arranged on the second base, and the second base is slidably arranged on the swing rod;

when the first anti-shake connecting portion is connected to the first connecting hole, and the second anti-shake connecting portion is connected to the second connecting hole, the fourth anti-shake connecting portion is separated from the second guide rail, the third anti-shake connecting portion is connected to the first guide rail and the first base, the first base is positioned by the third anti-shake connecting portion in a guiding direction of the first guide rail, and the camera can rotate around the first anti-shake connecting portion with the swing of the swing rod; and when the first anti-shake connecting portion is connected to the first connecting hole, and the second anti-shake connecting portion is separated from the second connecting hole, the fourth anti-shake connecting portion is slidably fitted to the second guide rail, the third anti-shake connecting portion is separated from the first base, the first base can slide along the first guide rail, and the camera can move along the first guide rail with the first base through the first anti-shake connecting portion.

5. The photographic apparatus according to claim 4, wherein when the first anti-shake connecting portion is separated from the first connecting hole, and the second anti-shake connecting portion is connected to the second connecting hole, the fourth anti-shake connecting portion is slidably fitted to the second guide rail:

the third anti-shake connecting portion is separated from the first base, the first base can slide along the first guide rail, and the camera can move along the second guide rail with the fourth anti-shake connecting portion through the second anti-shake connecting portion.

6. The photographic apparatus according to claim 5, wherein the first anti-shake connecting portion is a first telescopic structural member, and the first telescopic structural member has a first extended state or a first contracted state, wherein:

when in the first extended state, the first anti-shake connecting portion extends into the first connecting hole to be connected to the first connecting hole, or when in the first contracted state, the first anti-shake connecting portion retracts to be separated from the first connecting hole.

7. The photographic apparatus according to claim 5, wherein the second anti-shake connecting portion is a second telescopic structural member, and the second telescopic structural member has a second extended state or a second contracted state, wherein:

when in the second extended state, the second anti-shake connecting portion extends into the second connecting hole to be connected to the second connecting hole, or when in the second contracted state, the second anti-shake connecting portion retracts to be separated from the second connecting hole.

8. The photographic apparatus according to claim 5, wherein:

the third anti-shake connecting portion is a third telescopic structural member, and the third telescopic structural member has a third extended state or a third contracted state, the third telescopic structural member is arranged on the first guide rail, and the first base is provided with a positioning hole, wherein:

when in the third extended state, the third telescopic structural member extends into the positioning hole, and the first base is positioned in the guiding direction of the first guide rail, or when in the third contracted state, the third telescopic structural member retracts and is separated from the positioning hole, and the first base can move along the first guide rail.

9. The photographic apparatus according to claim 5, wherein:

the first guide rail is a first groove body, the first base is arranged in the first groove body, the second guide rail is a second groove body, when the first anti-shake connecting portion is connected to the first connecting hole, the second anti-shake connecting portion is separated from the second connecting hole, when the first anti-shake connecting portion is separated from the first connecting hole, the second anti-shake connecting portion is connected to the second connecting hole, and the fourth anti-shake connecting portion is partially located in the second groove body and is slidably fitted to the second groove body.

10. The photographic apparatus according to claim 9, wherein:

the fourth anti-shake connecting portion is a fourth telescopic structural member, and the fourth telescopic structural member has a fourth extended state or a fourth contracted state, wherein when in the fourth extended state, the fourth telescopic structural member extends into the second groove body and is slidably fitted to the second groove body, or when in the fourth contracted state, the fourth telescopic structural member retracts to be located outside the second groove body.

11. The photographic apparatus according to claim 3, wherein:

the driving portion comprises a driving motor and a rotating wheel, a first end of the swing rod is rotatably connected to the first base, a second end of the swing rod is movably connected to the rotating wheel, the driving motor is connected to the rotating wheel, the driving motor drives the rotating wheel to rotate, and the rotating wheel can drive the swing rod to swing.

12. An electronic device, comprising the photographic apparatus comprising: a camera; a camera holder; and an anti-shake mechanism, wherein:

the camera is supported on the camera holder through the anti-shake mechanism, and the camera is provided with a first connecting hole and a second connecting hole arranged at intervals;

the anti-shake mechanism comprises a first anti-shake connecting portion, a second anti-shake connecting portion, a swing rod, and a driving portion, and the driving portion and the first anti-shake connecting portion are arranged on the camera holder;

the swing rod is rotatably connected to the camera holder, the driving portion is connected to the swing rod and can drive the swing rod to rotate, and the second anti-shake connecting portion is arranged on the swing rod and can swing with the swing rod; and when the first anti-shake connecting portion is connected to the first connecting hole, and the second anti-shake connecting portion is connected to the second connecting hole, the camera can rotate around a rotation axis of the first anti-shake connecting portion with the swing of the swing rod, wherein the optical axis of the camera is coaxial with the rotation axis of the first anti-shake connecting portion.

13. The electronic device according to claim 12, wherein the anti-shake mechanism further comprises a connecting rod, wherein a first end of the connecting rod is rotatably connected to the first anti-shake connecting portion, and a second end of the connecting rod is rotatably connected to the second anti-shake connecting portion.

14. The electronic device according to claim 13, wherein the anti-shake mechanism further comprises a first base, wherein:

the first base is arranged on the camera holder, the first anti-shake connecting portion is arranged on the first base, and the swing rod is rotatably connected to the first base.

15. The electronic device according to claim 14, wherein the anti-shake mechanism further comprises a first guide rail, a second guide rail, a second base, a third anti-shake connecting portion, and a fourth anti-shake connecting portion, wherein:

both the first guide rail and the second guide rail are fixed on the camera holder, and the first guide rail and the second guide rail are perpendicular to each other;

both the third anti-shake connecting portion and the first base are arranged on the first guide rail;

both the second anti-shake connecting portion and the fourth anti-shake connecting portion are arranged on the second base, and the second base is slidably arranged on the swing rod:

when the first anti-shake connecting portion is connected to the first connecting hole, and the second anti-shake connecting portion is connected to the second connecting hole, the fourth anti-shake connecting portion is separated from the second guide rail, the third anti-shake connecting portion is connected to the first guide rail and the first base, the first base is positioned by the third anti-shake connecting portion in a guiding direction of the first guide rail, and the camera can rotate around the first anti-shake connecting portion with the swing of the swing rod; and when the first anti-shake connecting portion is connected to the first connecting hole, and the second anti-shake connecting portion is separated from the second connecting hole, the fourth anti-shake connecting portion is slidably fitted to the second guide rail, the third anti-shake connecting portion is separated from the first base, the first base can slide along the first guide rail, and the camera can move along the first guide rail with the first base through the first anti-shake connecting portion.

16. The electronic device according to claim 15, wherein when the first anti-shake connecting portion is separated from the first connecting hole, and the second anti-shake connecting portion is connected to the second connecting hole, the fourth anti-shake connecting portion is slidably fitted to the second guide rail:

the third anti-shake connecting portion is separated from the first base, the first base can slide along the first guide rail, and the camera can move along the second guide rail with the fourth anti-shake connecting portion through the second anti-shake connecting portion.

17. The electronic device according to claim 16, wherein the first anti-shake connecting portion is a first telescopic structural member, and the first telescopic structural member has a first extended state or a first contracted state, wherein:

when in the first extended state, the first anti-shake connecting portion extends into the first connecting hole to be connected to the first connecting hole, or when in the first contracted state, the first anti-shake connecting portion retracts to be separated from the first connecting hole.

18. The electronic device according to claim 16, wherein the second anti-shake connecting portion is a second telescopic structural member, and the second telescopic structural member has a second extended state or a second contracted state, wherein:

when in the second extended state, the second anti-shake connecting portion extends into the second connecting hole to be connected to the second connecting hole, or when in the second contracted state, the second anti-shake connecting portion retracts to be separated from the second connecting hole.

* * * * *